(12) United States Patent
Bennett, III et al.

(10) Patent No.: US 8,107,594 B2
(45) Date of Patent: Jan. 31, 2012

(54) SECURITY SYSTEM WITH CALL MANAGEMENT FUNCTIONALITY

(75) Inventors: Raymond Walden Bennett, III, Naperville, IL (US); John Roland Beardsley, Rolling Meadows, IL (US)

(73) Assignee: AT&T Intellectual Property, L.P., Atlanta, GA (US)

( * ) Notice: Subject to any disclaimer, the term of this patent is extended or adjusted under 35 U.S.C. 154(b) by 1402 days.

(21) Appl. No.: 11/605,675

(22) Filed: Nov. 29, 2006

(65) Prior Publication Data

US 2007/0274461 A1    Nov. 29, 2007

Related U.S. Application Data

(63) Continuation of application No. 10/017,989, filed on Dec. 6, 2001, now Pat. No. 7,167,543, which is a continuation of application No. 09/366,359, filed on Aug. 3, 1999, now Pat. No. 6,370,233.

(51) Int. Cl.
*H01R 33/96* (2006.01)
(52) U.S. Cl. .......................... 379/37; 379/42; 379/90.01
(58) Field of Classification Search ............... 279/90.01, 279/37–45; 340/541, 531
See application file for complete search history.

(56) References Cited

U.S. PATENT DOCUMENTS

| | | | |
|---|---|---|---|
| 4,107,466 A | 8/1978 | Churchill | |
| 4,503,288 A * | 3/1985 | Kessler | 379/88.16 |
| 4,578,540 A | 3/1986 | Borg | |
| 4,612,419 A | 9/1986 | Smith | |
| 4,665,544 A | 5/1987 | Honda | |
| 5,031,205 A * | 7/1991 | Phillips | 379/88.23 |
| 5,274,698 A | 12/1993 | Jang | |
| 5,315,636 A | 5/1994 | Patel | |
| 5,363,425 A | 11/1994 | Mufti | |
| 5,402,469 A | 3/1995 | Hopper | |
| 5,440,620 A | 8/1995 | Slusky | |
| 5,479,496 A | 12/1995 | Endo | |
| 5,596,633 A | 1/1997 | Meier | |
| 5,621,662 A | 4/1997 | Humphries et al. | |
| 5,682,142 A | 10/1997 | Loosmore | |
| 5,689,235 A * | 11/1997 | Sugimoto et al. | 340/541 |
| 5,712,911 A * | 1/1998 | Her | 379/388.01 |
| 5,724,411 A | 3/1998 | Eisdorfer et al. | |
| 5,802,157 A * | 9/1998 | Clarke et al. | 379/196 |
| 5,901,211 A | 5/1999 | Dean et al. | |
| 5,995,597 A | 11/1999 | Woltz et al. | |
| 6,002,427 A | 12/1999 | Kipust et al. | |
| 6,005,870 A | 12/1999 | Leung et al. | |
| 6,263,064 B1 * | 7/2001 | O'Neal et al. | 379/201.03 |

(Continued)

FOREIGN PATENT DOCUMENTS

JP    04334158 A    11/1992

(Continued)

*Primary Examiner* — Melur Ramakrishnaiah
(74) *Attorney, Agent, or Firm* — Toler Law Group, PC

(57) ABSTRACT

A security system with call management functionality is disclosed and includes a security controller having at least one first interface to at least one user identification device and a second interface to a call management controller. The security controller also includes logic to determine a security status of a user based on identification information received from the at least one user identification device and to communicate the security status of the user to the call management controller, where the call management controller enables, disables, or modifies a communication service based on the security status of the user.

20 Claims, 1 Drawing Sheet

U.S. PATENT DOCUMENTS

| | | | |
|---|---|---|---|
| 6,345,047 B1 * | 2/2002 | Regnier ......................... | 370/352 |
| 6,370,235 B1 * | 4/2002 | Heiner .......................... | 379/67.1 |
| 6,418,216 B1 * | 7/2002 | Harrison et al. ............ | 379/208.01 |
| 6,490,444 B1 * | 12/2002 | Bossemeyer et al. ...... | 455/412.2 |

FOREIGN PATENT DOCUMENTS

| | | |
|---|---|---|
| JP | 08116355 A | 5/1996 |
| JP | 362073846 A | 5/1996 |
| JP | 410098521 A | 4/1998 |

* cited by examiner

SECURITY SYSTEM WITH CALL MANAGEMENT FUNCTIONALITY

CLAIM OF PRIORITY

The present application claims priority from and is a continuation of U.S. patent application Ser. No. 10/017,989 filed on Dec. 6, 2001 and entitled "Security System With Call Management Functionality," now U.S. Pat. No. 7,167,543, which is a continuation of U.S. patent application Ser. No. 09/366,359 filed on Aug. 3, 1999, now U.S. Pat. No. 6,370,233. The contents of U.S. patent application Ser. No. 09/366,359, now U.S. Pat. No. 6,370,233, are expressly incorporated herein by reference in their entirety.

FIELD OF THE DISCLOSURE

The present disclosure relates generally to security systems and more particularly to a security system with call management functionality.

BACKGROUND

Because of increased security concerns many homeowners have a home security system. Many of these home security systems can be configured so that each resident is assigned a unique passcode. In operation, these individual passcodes can be used to change security system status or make ad hoc changes to system parameters. For example, security system status is commonly changed from "standby" to "arm" when the occupants are away. Similarly, system parameters are commonly changed to, for example, permit the security system to be in "night mode" even though there are open windows.

Security systems receive passcodes a number of different ways. Typically, a security system receives passcodes and system commands through a keypad. Recently, however, it has been suggested that security systems receive passcodes and system commands a variety of ways. For example, a user could be identified automatically by carrying a transponder, or by using a magnetically coded house key, or by using voice recognition.

Besides home security systems, many homeowners subscribe to a variety of call management services. These services range from call waiting and caller ID, to voice mail and restricted 900 number access. These services are not typically related to any individual's presence in the home. A number of additional services could be provided to a homeowner if these call management services were integrated with a home security system.

Thus, there exists a need for a security system that can integrate the security system with the call management services already found in many homes.

DETAILED DESCRIPTION OF THE DRAWINGS

Figure 1:
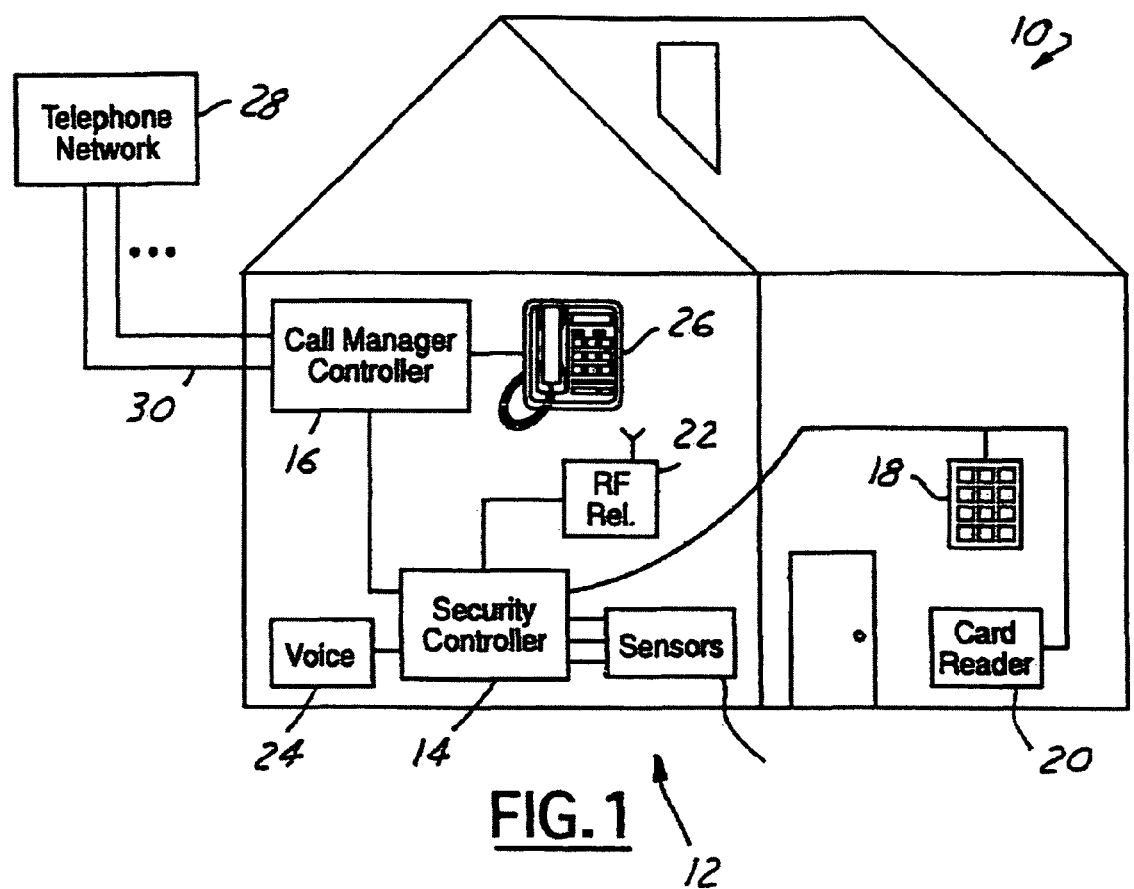
FIG. 1 is a block diagram of a house having a security system with call management functionality according to the present disclosure.

The present disclosure is generally directed to a security system with call management functionality. In a particular embodiment, the security system includes a security controller having at least one first interface to at least one user identification device and a second interface to a call management controller. The security controller also includes logic to determine a security status of a user based on identification information received from the at least one user identification device and to communicate the security status of the user to the call management controller, where the call management controller enables, disables, or modifies a communication service based on the security status of the user.

In another particular embodiment, the disclosure is directed to a call management controller having an interface to a security controller and logic to receive a security status of a user from the security controller and to enable, disable, or modify a telephone service based on the security status of the user.

Referring to FIG. 1, a block diagram of a house 10 having a security system 12 with call management functionality according to the present disclosure is illustrated. Security system 12 is located in house 10 and includes two major components comprising a security controller 14 and a call management controller 16.

Security controller 14 is located in house 10 and is coupled to a plurality of sensors 18 to provide security system functions. The security controller 14 and sensors 18 are conventional. For example, sensors 18 are located in various positions in house 10 and include window and door position sensors and motion detectors to detect unauthorized entry into house 10. Security controller 14 is also coupled to several devices that are used for user identification and system commands. Additionally, security controller 14 is conventionally also tied to a phone line to contact 911 or a monitoring center. Each user of security system 12 has a unique ID or passcode.

Call management controller 16 is located in house 10 and is coupled to at least one handset 26 and a telephone network 28, which provides at least one phone line 30. Call management controller 16 is also coupled to security controller 14. By using information from security controller 14, call management controller 16 can provides a variety of new call management services as is more fully described below.

In the present invention, user identification is accomplished through a keypad 18, a card reader 20, a radio frequency receiver 22, a voice processing system 24 or the like. Keypad 18 can be located anywhere in house 10 and identifies users and changes system settings through input of unique passcodes and command codes. Card reader 20 is usually located near an entrance to house 10 and identifies users through a magnetically coded door key that is unique to each user. Radio frequency receiver 22 is located so that it can receive a signal from a unique transponder (not pictured) carried by any user of security system 12. Users are identified through communication between the individual transponder and radio frequency receiver 22. Voice processing system 24 is located so that it can receive voice commands from security system users. Voice processing system 24 includes a speaker verification module to identify individual users and a speech recognition module to process verbal commands.

The user identification devices allow security system 12 to identify individuals and monitor their presence in house 10. Thus, each individual not only has an identity, but also has a specific security status associated with their identity. Knowing which users are in house 10 and knowing each individual's security status and the security status of security system 12 allows call management controller 16 to define and customize call management services. These novel services can include night mode privacy, automated attendant, "follow me" service, "kid kontrol", "maid minder", and voice mail delivery.

In operation, the night mode privacy service functions in the following manner. When the security system 12 has been placed in night mode, all calls will be answered and the caller will be advised to leave a message unless it is an emergency. If the caller insists the call is important, the telephone 26 will ring. In the preferred embodiment, the telephone 26 will ring with a distinctive ring to denote an emergency call.

The automated attendant service functions in the following manner. Each user has a unique telephone number. When a call comes for a specific user, the telephone 26 rings as usual if the user is present in house 10. User presence is determined, as above, by the identification device. If the user is not present in house 10, an automated attendant offers to take a message without ringing telephone 26. If a call for a user known to be present in house 10 is not answered, then the automated attendant answers the call and takes a message. In this case, the automated attendant may also page the intended user, or ask the caller to hold the line and continue ringing telephone 26. If a user is on a call and another comes through, the user would get a call-waiting signal. Preferably, this call-waiting signal would be unique for each user.

The "follow me" service functions in the following manner. Multiple security systems may be interfaced to monitor several locations for user presence. In such a case, the security system distinguishes whether, for example, a user is occupying house 10, a neighbor's house or a work location. Thus, the security system controller 14 is aware when the user leaves or enters a location. In this manner, calls are directed toward a telephone 26 nearest the user location. Alternatively, calls could be transferred to voice mail if the user is not present, or forwarded to a known location, such as a cellular or mobile phone or other location.

The "kid kontrol" service functions in the following manner. Because each individual not only has a unique identity, but also has a specific security status associated with their identity, the presence of only minor children in house 10 can be determined. When this is determined, outbound telephone calls can be restricted in one of several ways. For example, toll calls can be prohibited or limited in length, total number of calls can be limited, duration of individual calls or total time on telephone 26 could be limited, etc. Another example of this service is "maid minder" that will limit numbers or types of calls when only service personnel are in the residence.

The voice mail delivery service functions in the following way. When a user enters house 10 and is identified, the security system could notify them that they have voice mail, e-mail, facsimiles or other messages. The call management system 16 could then offer to deliver these messages. Preferably, voice-processing system 24 would verbally notify the user and commence playback of any messages. Alternatives include using a speaker integrated with keypad 18, where the user is notified of messages upon manual passcode entry. If the user's identity is established using some device that requires no active involvement by the user, i.e., a radio frequency receiver/transponder, then the voice mail delivery service rings telephone 26 and notifies the user that they have messages. Preferably, the voice mail delivery service uses a distinctive ring.

From the foregoing, it can be seen that there has been brought to the art a new and improved security system with call management functionality. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A security controller, comprising:
   at least one first interface to at least one user identification device;
   a second interface to a call management controller; and
   logic to:
   determine a security status of a user based on identification information received from the at least one user identification device, wherein the security status of the user includes location information that identifies one of a plurality of areas of a customer premises where the user is located; and
   communicate the security status of the user to the call management controller, wherein the call management controller enables, disables, or modifies a communication service based on the security status of the user.

2. The security controller of claim 1, wherein the communication service is a telephone service.

3. The security controller of claim 1, wherein the at least one user identification device includes a keypad to receive manual entry of a user passcode, a card reading device to read a magnetic user identification card, or any combination thereof.

4. The security controller of claim 1, wherein the logic determines a second security status of a security system based on a system command and communicates the second security status of the security system to the call management controller.

5. The security controller of claim 4, wherein the call management controller enables, disables, or modifies a telephone service based on the second security status of the security system.

6. The security controller of claim 1, further comprising a third interface to at least one security sensor to provide at least one home security function.

7. The security controller of claim 6, wherein the at least one security sensor includes a door position sensor, a window position sensor, a motion detector, or any combination thereof.

8. The security controller of claim 1, further comprising a fourth interface to a communication path to contact a public safety answering point of an emergency-calling system (911), a private emergency monitoring center, or any combination thereof.

9. The security controller of claim 1, wherein the at least one user identification device includes at least one of a radio frequency receiver to receive a signal from a user transponder and a voice processing system to identify user speech.

10. A call management controller, comprising;
    a first interface to a network;
    a second interface to a security controller associated with a security system, wherein the security system is associated with a user; and
    logic to:
    receive information from the first interface and the second interface, wherein the information includes a first security status of the user received from the security controller via the second interface and a second security status of the user received from the network via the first interface;
    determine a security status based on the first security status of the user and the second security status of the user; and
    enable, disable, or modify a telephone service based on the security status.

11. The call management controller of claim 10, wherein the security controller determines the first security status of the user based on identification information received from at least one user identification device accessible to the security controller.

12. The call management controller of claim 11, wherein the logic informs the user of at least one message when the user interacts with the at least one user identification device.

13. The call management controller of claim 10, wherein the logic receives a third security status of a security system from the security controller, and wherein the security status is further determined based on the third security status of the security system.

14. The call management controller of claim 13, wherein the logic provides a night mode privacy service when the third security status of the security system is night mode, the night mode privacy service including advising a caller to leave a message when the caller does not indicate an emergency and ringing a telephone when the caller indicates an emergency.

15. The call management controller of claim 14, wherein the logic rings the telephone using a ring indicating an emergency call.

16. The call management controller of claim 10, wherein the logic rings a telephone when the security status indicates that the user is at a home location and prompts a caller to record a message without ringing the telephone when the security status indicates that the user is not present at the home location.

17. The call management controller of claim 16, wherein the logic selects the user from a plurality of users based on a telephone number at which a call is received.

18. The call management controller of claim 16, wherein the logic sends a call-waiting signal to the telephone when the security status indicates that the user is present at the home location and that the user is interacting with another call at the telephone.

19. The call management controller of claim 10, wherein the logic forwards a call to a second location when the security status indicates that the user is not present at a home location and when the security status indicates that the user is present at a second location, wherein the second location includes at least one of a work location, a neighbor location, a car location, and a business location.

20. The call management controller of claim 10, wherein the logic limits duration, cost, destination, or any combination thereof, with respect to calls placed from a telephone when the security status indicates that the user is present at a home location.

\* \* \* \* \*